Aug. 28, 1934.  A. J. GRANBERG  1,971,559
LIQUID METER
Filed Dec. 26, 1929   2 Sheets-Sheet 1
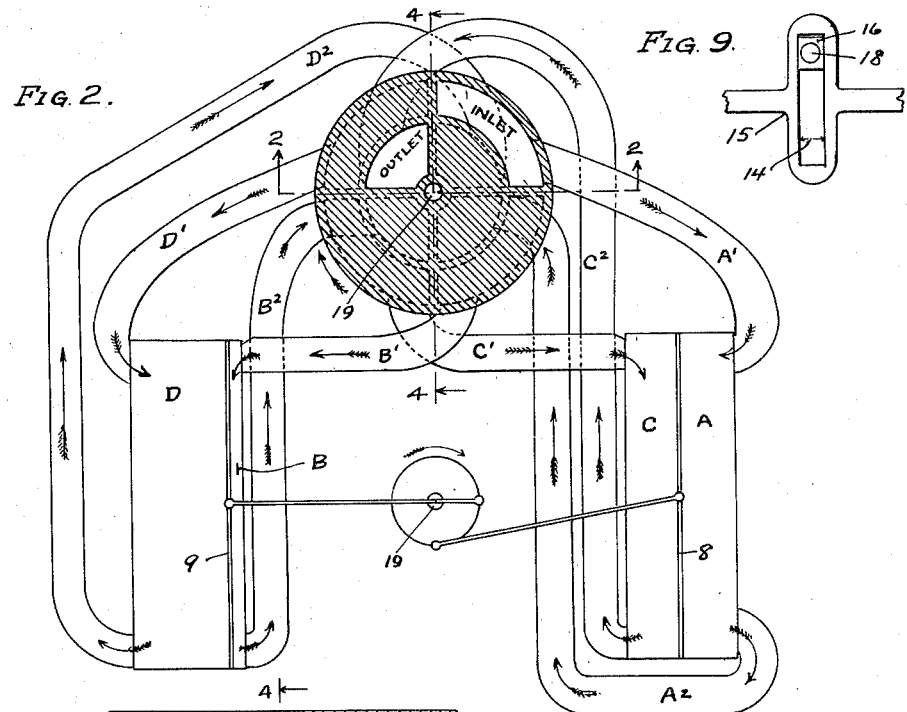
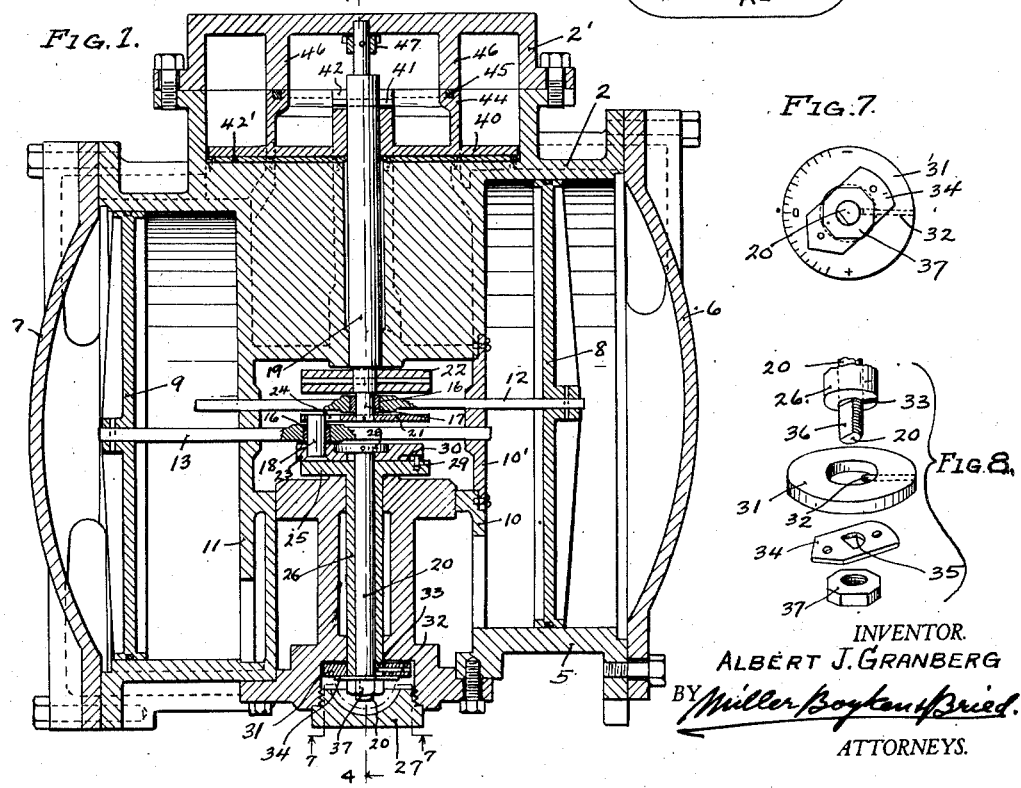
INVENTOR.
ALBERT J. GRANBERG
BY Miller Boyken &Bried
ATTORNEYS.

Aug. 28, 1934.  A. J. GRANBERG  1,971,559
LIQUID METER
Filed Dec. 26, 1929  2 Sheets-Sheet 2
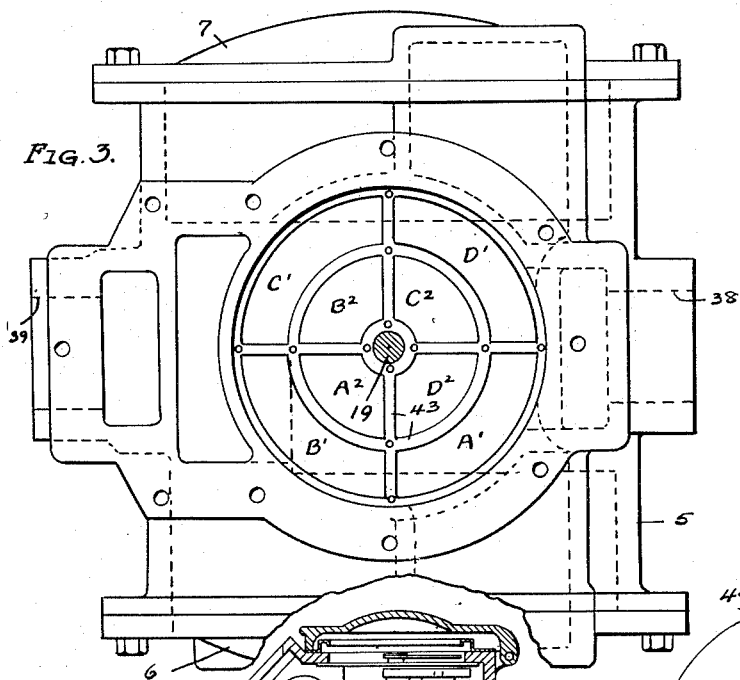
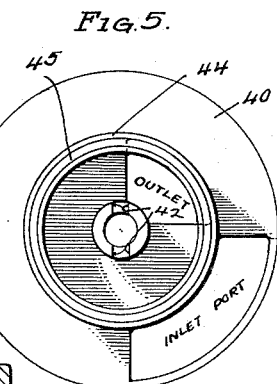
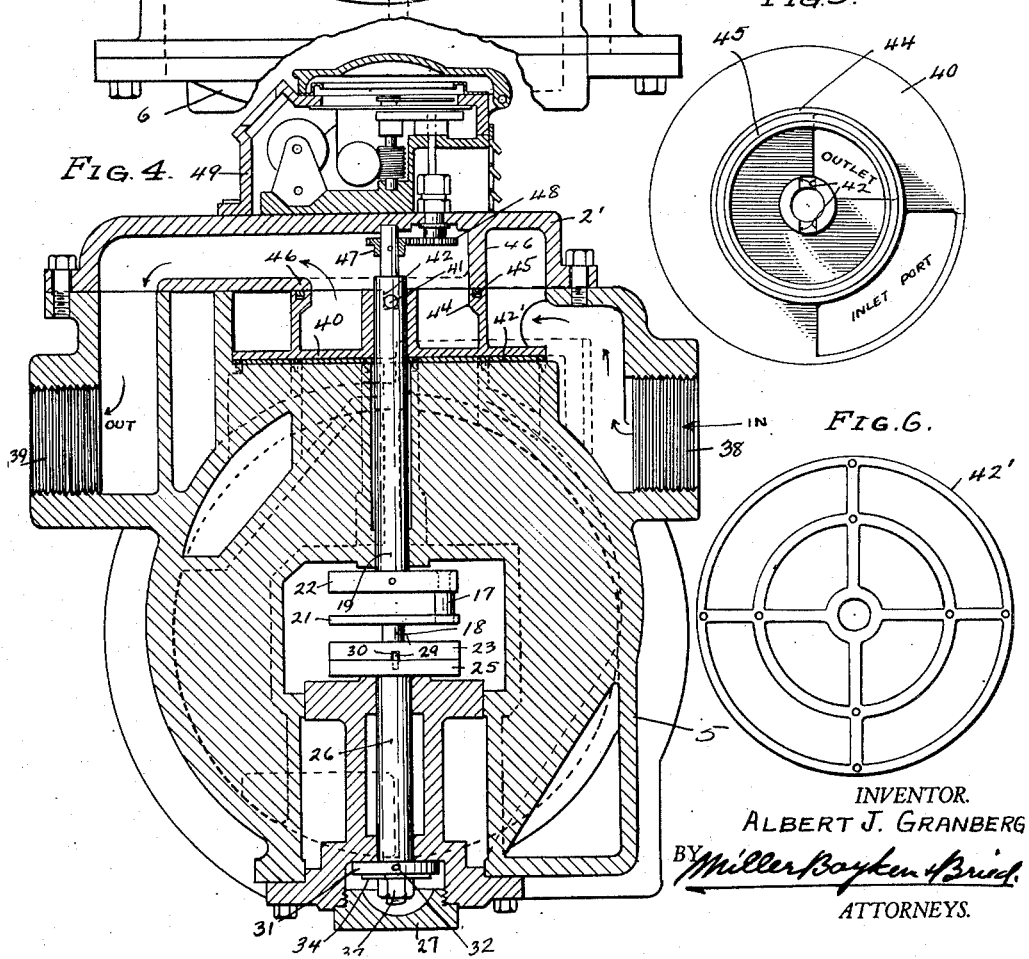
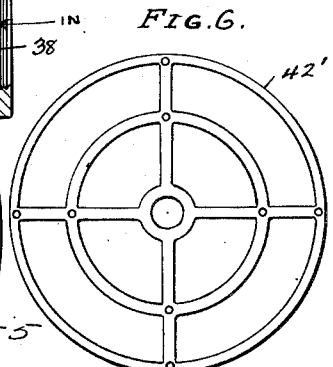
INVENTOR.
ALBERT J. GRANBERG
BY
ATTORNEYS.

Patented Aug. 28, 1934

1,971,559

UNITED STATES PATENT OFFICE 1,971,559

LIQUID METER

Albert J. Granberg, Berkeley, Calif., assignor to Ralph N. Brodie Company, Oakland, Calif., a corporation of California Application December 26, 1929, Serial No. 416,470

8 Claims. (Cl. 73—30)

This invention relates to liquid meters of the reciprocating piston type and has for its objects improvements in such meters whereby they are more accurate in measuring the liquid passing through the meter and the volume displaced by the piston may be controlled.

In the drawings accompanying this application Fig. 1 is a vertical section through the meter body showing its two cylinders, pistons and internal construction.

Fig. 2 is a diagrammatic layout of the meter showing the relation of its valve ports to the piston sides.

Fig. 3 is a plan view of Fig. 1 with the top portion and valve removed.

Fig. 4 is a cross section of Fig. 1 as seen from the lines 4—4 thereof.

Fig. 5 is a plan view of the valve in position as removed from Fig. 3.

Fig. 6 is a plan view of the valve seat or metal gasket rings as removed from Fig. 3.

Fig. 7 is a plan view of the lower end of the shaft assembly as seen from the line 7—7 of Fig. 1.

Fig. 8 is a perspective view of the items composing Fig. 7.

Fig. 9 is a plan view of one of the yoke piston rods showing the slidable crank pin bearing.

In further detail the meter comprises a body casting 5 provided with horizontally extending cylinders covered respectively by heads 6, 7, and fitted with pistons 8, 9.

The cylinders are in line when viewed in plan but are vertically offset when viewed from the side as in Fig. 1 and they are separated at their inner ends from one another by spaced vertical walls 10, 11 providing a space intermediate the walls for crank mechanism by which the pistons are operatively connected. Wall 10 is provided with a removable plate or section 10' accessible when head 6 and piston 8 are removed and which is to facilitate inserting the piston rods 12, 13 which are respectively pinned or otherwise connected at their outer ends to hubs formed on the pistons and which rods both pass through nicely fitting openings in both walls and which openings may be suitably packed if desired.

The pistons are carried to a large degree on the rods so that much of their weight is removed from the lower wall of the cylinders, and each rod is provided centrally with a cross slot 14 in a yoke frame 15 as shown in Fig. 9 and within the slot is a slidable bearing 16 adapted to receive crank pins 17, 18 respectively of aligned shafts 19, 20.

Crank pin 17 is formed integrally with or rigidly assembled with crank disks 21 and 22, the latter being at the lower end of shaft 19.

Crank pin 18 however is rigidly secured at its lower end to a disk 23 and projects freely at its upper end through a radial slot 24 in disk 21 so that disks 21, 22 and 23 with both pins will revolve as a unit.

Disk 23 floats or rests freely on another disk 25 in turn secured to the end of a tubular shaft 26 rotatably extending through the body with its outer end accessible but covered by a removable cap 27, while rotatably mounted within tubular shaft 26 is shaft 20 which carries at its upper end an eccentrically mounted or cam disk 28 seated in a suitable recess in floating disk 23 so that upon rotating shaft 20 within tubular shaft 26 floating disk 23 can be moved back and forth on disk 25 to carry crank pin 18 radially in slot 24 of disk 21 toward and away from axis of shaft 26 to thus vary the stroke of piston 9 which is connected to this crank pin whereby the volume of liquid displaced by the piston may be controlled.

A small pin 29 projecting from disk 25 into a radial slot 30 in disk 23 guides the floating disk upon turning cam disk 28.

The assemblage at the outer ends of shafts 20 and 26 is shown in Figs. 1, 7 and 8, and comprises a thick washer 31 provided with a pin 32 fitting in a slot 33 in end of shaft 26 so that it will not turn on the shaft, an elongated or arrow plate 34 with a flat-sided hole 35 in it fitting over the flattened end 36 of shaft 20 and a nut 37 which screws over the end of shaft 20 to clamp the members together and draw the cam disk 28 down against disk 23 to lock same tightly against disk 25 so that the assemblage will all revolve as a unit with shaft 20.

The liquid to be metered enters the meter body at the inlet connection 38 and finally emerges at the outlet connection 39 (see Fig. 4) and between the inlet and outlet is diverted to different sides of the pistons by means of a rotary valve 40 which is secured to the shaft 19 by means of a pin 41 which works freely in a slot 42 formed in the hub of the valve. The valve is a cup with a flat bottom resting on a flat skeleton seat 42' preferably of non-corrodible metal or other material secured in place on the upper edges of walls and ribs 43 of the body separating the various liquid channels. The cup portion of the valve is an annular wall 44 fitted with a spring sealing ring 45 which resiliently presses upwards against a circular wall 46 formed on the upper detachable part 2' of the body.

Above the valve the shaft 19 is reduced in diameter and is provided with a pinion gear 47 meshing with a gear 48 of any suitable counting or tally mechanism housed in a casing 49 secured to the removable end 2' of the meter.

The valve has an outer portion cut-out to form an inlet port and a portion cut-out within its circular wall to form an outlet port, both so designated in the drawings (Fig. 5), and the body is ported with eight cored passages leading to and from opposite sides of both pistons as indicated in Fig. 2 wherein opposite sides of piston 8 are designated A, B, C, D, and wherein the inlet passages of the body respectively connecting with the sides A, B, C, D of the pistons are designated A', B', C', D' and the outlet passages $A^2$, $B^2$, $C^2$, $D^2$.

With reference to Fig. 4 it will be seen that a liquid entering the meter at 38 will be guided by the walls of the castings to the inlet of the cup-like valve and the liquid from the outlet of the valve will be led to discharge at 39, while a consideration of Fig. 2 will show that with the pistons set at 90 degrees and rotation of the parts as indicated, the liquid will successively follow the paths to and from A, B, C, D, as shown so that the motion of the pistons will be constant and uniform as long as there is a head of liquid supplying the inlet side 38 of the meter.

It will also be seen that the flat bottomed revolving valve is held to its seat by water pressure so that it will tend to remain tight, though if it should be required to remove it for dressing its surface or replacing the ring seat 42, this is easily done by simply removing the detachable portion 2' of the body without disturbing any of the other working parts of the mechanism.

With respect to my appended claims, where I use the words "crank disk" or "disks" to denote the cranks or parts 21 to 25, such use is intended to cover the equivalents of these members whether complete disks or not as it is evident that they need not be complete disks, nor need they be circular, but may assume a variety of shapes as long as they function in the manner indicated.

I claim:

1. A liquid meter comprising a body provided with a plurality of reciprocable pistons operating in separate horizontally disposed cylinders, means connecting the pistons for simultaneous operation upon admitting liquid under pressure to the cylinders, and means for successively guiding liquid to and from the cylinders including inlet passages delivering liquid to the upper sides of the cylinders and outlet passages taking liquid from the lower sides of the cylinders, and a valve with an inlet port through which all inlet passages receive their liquid, and an outlet port through which all outlet passages discharge.

2. In a liquid meter including a body provided with reciprocating pistons, a crank shaft, and rods connecting the pistons to said crank shaft for simultaneous operation, said shaft comprising a plurality of co-axial sections and a floating crank pin adjustable on one section for varying its throw, the shaft section on which said crank pin is adjustable being tubular, a smaller shaft extending through the tubular shaft provided with means at its inner end associated with the crank pin for moving said crank pin toward and away from the axis of the tubular shaft upon turning the smaller shaft, and means accessible at the side of the meter for so turning said smaller shaft and locking same relative to the tubular shaft.

3. In a liquid meter including a body provided with cylinders, a crank shaft and reciprocating pistons in said cylinders, said pistons connected to said crank shaft for simultaneous operation and the cylinders provided with separate dual intake and exhaust passages at opposite sides respectively of each piston, a rotary valve on said shaft controlling the flow of liquid through the plurality of passages to and from opposite sides of said pistons, said valve being a flat disk seated over the ends of the passages and provided with an annular perpendicularly extending wall on top of the disk with its outer edge seated against said body, said wall disposed intermediate the outer edge and center of the disk and dividing the valve into inner and outer chambers which are respectively ported to inlet and outlet groups of passages controlled by said valve.

4. In a liquid meter including a body provided with cylinders, a crank shaft and reciprocating pistons in said cylinders, said pistons connected to said crank shaft for simultaneous operation and the cylinders provided with separate dual intake and exhaust passages at opposite sides respectively of each piston, a rotary valve on said shaft controlling the flow of liquid through the plurality of passages to and from opposite sides of said pistons, a portion of said valve being a flat disk seated over the ends of the passages, the ends of said passages being in groups under the disk with the inlet and outlet groups respectively concentrically arranged.

5. In a liquid meter including a body provided with cylinders, a crank shaft and reciprocating pistons in said cylinders, said pistons connected to said crank shaft for simultaneous operation and the cylinders provided with separate dual intake and exhaust passages at opposite sides respectively of each piston, a rotary valve on said shaft controlling the flow of liquid through the plurality of passages to and from opposite sides of said pistons, a portion of said valve being a flat disk seated over the ends of the passages, the ends of said passages being grouped in a circular area and a flat spider valve seat positioned between the valve disk and the ends of the passages.

6. In a liquid meter including a body provided with cylinders, a crank shaft and reciprocating pistons in said cylinders, said pistons connected to said crank shaft for simultaneous operation and the cylinders provided with separate dual intake and exhaust passages at opposite sides respectively of each piston, a rotary valve on said shaft controlling the flow of liquid through the plurality of passages to and from opposite sides of said pistons, a portion of said valve being a flat disk seated over the ends of the passages, the ends of said passages being arranged in two groups within a circular area covered by the valve disk, being an inner group and an outer group concentrically arranged with an intermediate circular wall dividing the two groups and the valve disk being separately ported respectively to the two groups of passages.

7. A liquid meter comprising a body with a measuring cylinder therein and a piston in said cylinder, a shaft rotatably supported in the body, a crank pin, a piston rod connecting said crank pin and said piston, means connecting said crank pin and said shaft for revolution of said crank pin around the axis of the shaft upon reciprocation of said piston, said crank pin being arranged and adapted for movement radially toward and away from the axis of said shaft, means for moving said crank pin radially of the axis of the shaft, said latter means being operably connected to said shaft for effecting said radial movement of the crank pin relative to the axis of the shaft upon manual rotation of said shaft, means for locking said crank pin against radial movement to and from the axis of the shaft at any desired point in such movement, said shaft and said locking means extending to and accessible at the side of the meter at all times for operation thereof in turning said shaft and for locking the crank pin against radial movement respectively.

8. In a liquid meter including a body provided with reciprocating pistons and rods connecting the pistons to a crankshaft for simultaneous operation, said shaft comprising a plurality of co-axial sections and a floating crank pin adjustable on one section for varying its throw, means for moving the crank pin radially of the shaft axis, a plate on which said crank pin is mounted and the shaft section on which said crank pin is adjustable being tubular, said plate positioned adjacent the inner end of the tubular shaft and perpendicular to the shaft axis, a smaller shaft extending through the tubular shaft provided with a cam device at its inner end for moving said plate and crank pin toward and away from the axis of the tubular shaft upon turning the smaller shaft, and means accessible at the side of the meter for so turning said smaller shaft and locking the same relative to the tubular shaft.

ALBERT J. GRANBERG.